Jan. 3, 1950  R. TUCK ET AL  2,493,172
SHOCK AND SWAY RESISTING OVERLOAD SPRING
Filed Sept. 12, 1947
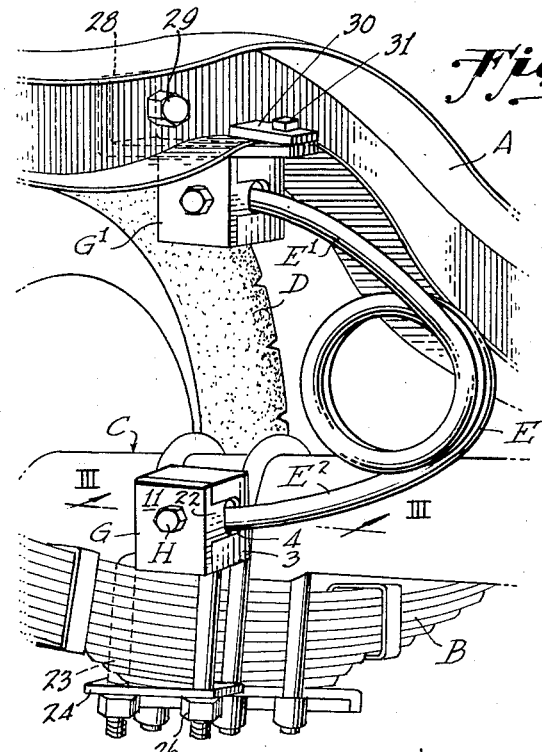
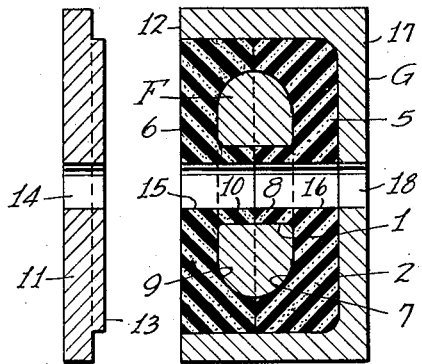
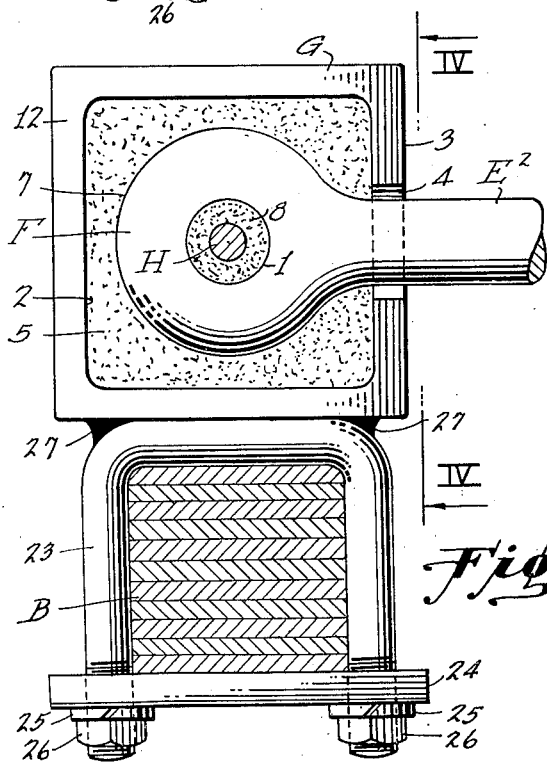
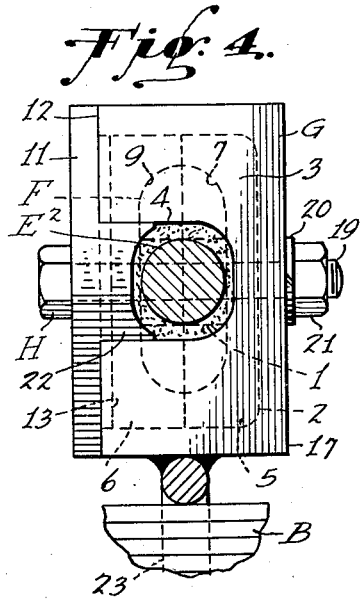
INVENTORS
RALPH TUCK
THOMAS E. HUGHES
ARTHUR U. RIGBY
BY Munn, Liddy & Glaccum
ATTORNEYS Patented Jan. 3, 1950

2,493,172

UNITED STATES PATENT OFFICE 2,493,172

SHOCK AND SWAY RESISTING OVERLOAD SPRING

Ralph Tuck, Oakland, Thomas E. Hughes, Berkeley, and Arthur U. Rigby, San Leandro, Calif.

Application September 12, 1947, Serial No. 773,596

2 Claims. (Cl. 267—26)

An object of our invention is to provide a shock and sway resisting overload spring which is an improvement over the overloading stabilizer shown in the pending application of Ralph Tuck, Serial No. 768,092, filed August 12, 1947. In the copending case, the ends of the stabilizer spring are mounted in upper and lower hangers which in turn are secured to the vehicle body and the axle housing. The two spring ends or arms have cylindrical heads that are surrounded by rubber and the rubber is compressed within the hangers to hold the arm ends in place.

In the present case we show the two spring ends provided with integral eyes through which bolts are passed for clamping the covers to the hangers and compressing the rubber therewithin. The bolt for each hanger performs a dual function of holding the hanger cover in place and of acting as a central anchorage for the eyelet. The portion of rubber surrounding the bolt and extending to the inner wall of the eyelet acts as a shock absorber and a silencer between the two.

A further object of our invention is to provide a device of the type described which may be readily attached to a vehicle having spring suspended wheels and which will aid the vehicle springs in supporting the load. At the same time the device acts as a shock and sway resisting overload spring.

Other objects and advantages will appear in the following specification, and the novel features of the device will be particularly pointed out in the appended claims.

Our invention is illustrated in the accompanying drawing forming a part of this application, in which:

Figure 1 is a perspective view of the device showing it operatively applied to a vehicle chassis and a vehicle spring.

Figure 2 is a vertical section through one of the hangers with the central bolt removed and showing the cover spaced from the hanger;

Figure 3 is a vertical section taken substantially along the line III—III of Figure 1 and illustrates the hanger with the cover and one of the rubber sockets removed; and Figure 4 is a section along the line IV—IV of Figure 3.

While we have shown only the preferred form of our invention, it should be understood that various changes or modifications may be made within the scope of the appended claims without departing from the spirit and scope of the invention.

In carrying out our invention, we make use of a vehicle having a chassis frame indicated generally at A and a leaf spring B for yieldingly connecting an axle housing C to the vehicle. A wheel D is supported by the axle housing in the usual manner. The parts thus far described form no part of our invention except in so far as they cooperate with the parts now to be described.

Our device comprises a spring coil E having integral ends or arms E1 and E2. Each arm is provided with an integral eye F and we have shown the eye in detail for the arm E2. The eye is formed at the end of the arm in any manner desired. The eye has a central opening 1 and this opening has a cylindrical wall as clearly shown in Figure 2. The outer surface of the eye is preferably semi-circular in cross section.

We provide a hanger G for each spring end E1 and E2 and the hangers receive the eyes. The hanger may be of any shape desired and we have shown it box-shaped in Figures 2 and 3. The hanger has an inner compartment 2 for receiving the eye. The wall 3 of the hanger is slotted at 4 for receiving the arm E2 and this permits the eye to be moved into the compartment 2. We surround the eye with a rubber support and the rubber is formed into two sockets 5 and 6, see Figure 2. The socket 5 has a ring-shaped recess 7 for receiving the inner half of the eye F. It will be noted from Figure 2 that the socket 5 has a central tubular extension 8 that has an outer diameter which will enter the eye opening 1.

The outer rubber socket 6 is shaped somewhat the same as the socket 5 and has a ring-shaped recess 9 for receiving the outer half of the eye F. The outer socket also has a central tubular member 10 for entering the eye opening 1 and this tubular portion will abut the end of the tubular portion 8. It will be seen that the two sockets before they are compressed will occupy the entire space provided by the compartment 2. A cover 11 is designed to close the open end 12 of the hanger and the cover has a projection 13 that enters the compartment 2 to a slight extent for compressing the rubber sockets tightly about the eye.

The means for securing the cover to the hanger also serves the additional function of acting as a central support for the eye. Referring to Figure 4, it will be seen that we provide a bolt H that is passed through a central opening 14 in the cover and through aligned central bores 15 and 16, provided in the sockets 6 and 5, respectively. The wall 17 of the hanger which is disposed opposite from the cover 11 is provided with a central opening 18 and this opening is aligned with the bores 15 and 16. The shank 19 of the bolt H is passed through all of these aligned openings and then a lock washer 20 and a nut 21 are secured to the bolt for locking it in place and for forcing the cover 11 into closed position against the open end 12 of the hanger. The rubber sockets are therefore compressed tightly about the eye F and the bolt H will act as a central anchorage for the eye. The tubular portions 8 and 10 of the sockets will be tightly pressed against the wall of the eye opening 1 and against the outer surface of the bolt shank 19. Figure 4 illustrates the cover 11 as being provided with a lip or an extension 22 that extends at right angles to the plane of the cover and is designed to enter the outer end of the slot 4, see Figure 4.

A hanger is applied to each end of the spring arms and the lower hanger G is shown welded or otherwise secured to a U-bolt 23. This bolt is shown straddling the leaves of the vehicle leaf spring B and the U-bolt is held in position by a strap 24, lock washers 25 and nuts 26. We show the welding of the hanger to the U-bolt at 27.

The upper hanger G1 is welded or otherwise secured to an angle shaped member 28. The member 28 is bolted to the chassis A by a bolt 29, see Figure 1 and the member also has a strap 30 that is secured thereto by a bolt 31 and this strap overlies the lower flange of the chassis channel frame.

From the foregoing description of the various parts of the device, the operation thereof may be readily understood.

The device may be quickly secured to a vehicle in the manner already described. The bolt H performs the dual function of holding the cover in closed position so as to compress the rubber sockets and at the same time the shank of the bolt acts as a central anchorage for the eye F. The rubber sockets are compressed with sufficient force to hold the eye in the position shown in Figures 2 and 3. The tubular portions 8 and 10 are compressed between the cylindrical wall of the eye and the outer cylindrical surface of the bolt shank. A firm anchorage is provided in this manner and the tubular portions act as silencers because they prevent the metal portion of the eye from striking the metal portion of the bolt.

As soon as the springs B of the vehicle flex due to the unevenness of the ground over which the vehicle is moving, the arms E1 and E2 will be moved toward each other and this movement will be resisted by the coil E. The coil and arms will therefore have a snubbing effect on the action of the springs B as well as act as additional resilient load carrying means. The device will tend to absorb any shocks from road obstructions and will tend to resist any swaying of the vehicle.

We claim:

1. In a device of the type described, a coil spring having an arm with an eye formed at its end, a hanger having an open side and a compartment for receiving the eye and a slotted wall through which the arm extends, the hanger having a wall disposed opposite the open side, a rubber socket in the compartment and having a ring-shaped recess for receiving a portion of the eye, a second rubber socket in the compartment and having a ring-shaped recess for receiving the other portion of the eye, both sockets having tubular central portions receivable in the opening of the eye, a cover for closing the open side and having a projection for entering the compartment for compressing the sockets, and a bolt extending through the cover, the sockets and the wall disposed opposite the open side for securing the cover to the hanger.

2. In a device of the type described, a coil spring having an arm with an eye formed at its end, a hanger having an open side and a compartment for receiving the eye and a slotted wall through which the arm extends, the hanger having a wall disposed opposite the open side, a rubber socket in the compartment and having a ring-shaped recess for receiving a portion of the eye, a second rubber socket in the compartment and having a ring-shaped recess for receiving the other portion of the eye, both sockets having tubular central portions receivable in the opening of the eye, a cover for closing the open side and having a projection for entering the compartment for compressing the sockets, and a bolt extending through the cover, the sockets and the wall disposed opposite the open side for securing the cover to the hanger, the tubular central portion surrounding the portion of the bolt extending through the eye opening for preventing contact between the bolt and the eye.

RALPH TUCK.
THOMAS E. HUGHES.
ARTHUR U. RIGBY.

REFERENCES CITED

The following references are of record in the file of this patent:

UNITED STATES PATENTS

| Number | Name | Date |
| --- | --- | --- |
| 1,153,876 | Thomas | Sept. 14, 1915 |
| 1,766,882 | Chryst | June 24, 1930 |
| 2,274,227 | Willard | Feb. 24, 1942 |

FOREIGN PATENTS

| Number | Country | Date |
| --- | --- | --- |
| 630,870 | Germany | June 8, 1936 |